Figure 4:
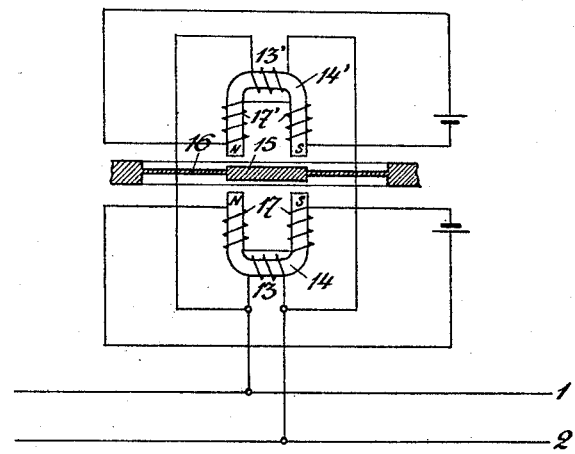

Aug. 18, 1925.
W. HAHNEMANN ET AL
PHASE REGULATING DEVICE
Filed Aug. 23, 1921
1,550,251
4 Sheets-Sheet 1
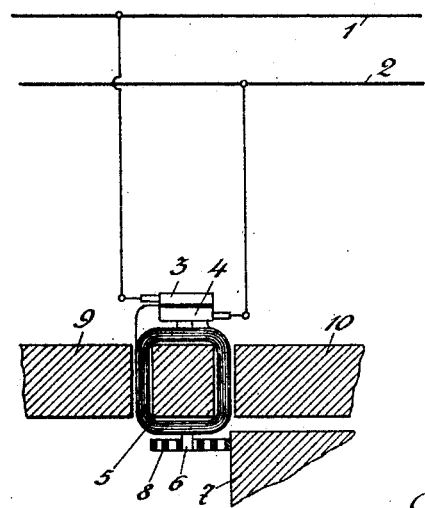
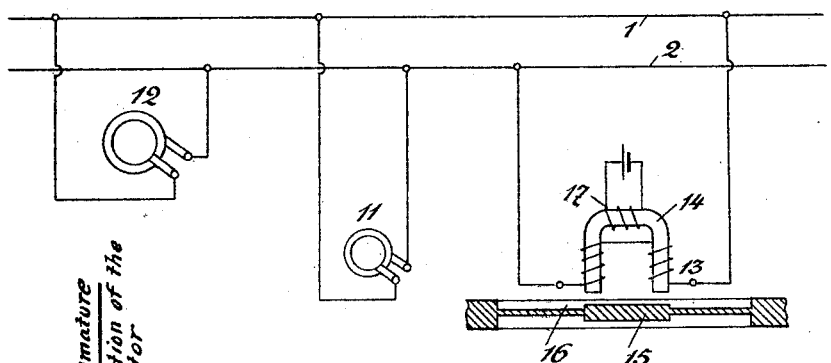
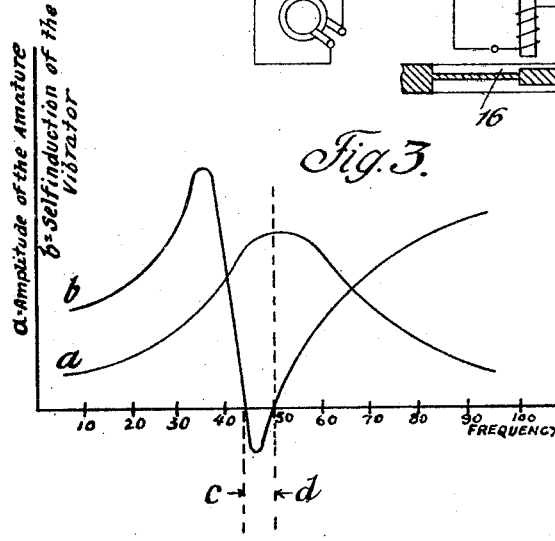
Inventors
Walter Hahnemann,
Wilhelm Rudolph, and
Heinrich Hecht.
by Knight Bros
Attorneys Aug. 18, 1925.

W. HAHNEMANN ET AL 1,550,251

PHASE REGULATING DEVICE

Filed Aug. 23, 1921

4 Sheets-Sheet 2

Aug. 18, 1925.
W. HAHNEMANN ET AL
PHASE REGULATING DEVICE
Filed Aug. 23, 1921      4 Sheets-Sheet 4
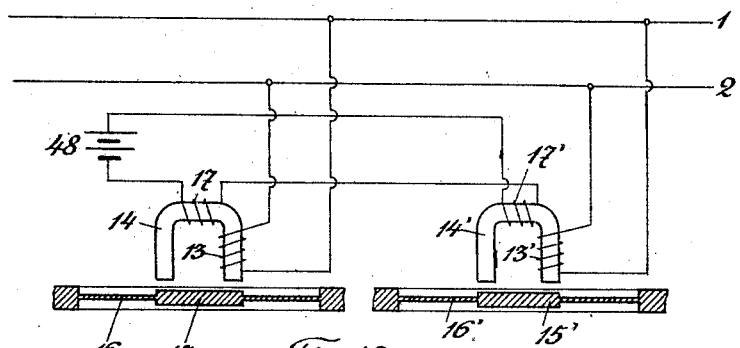
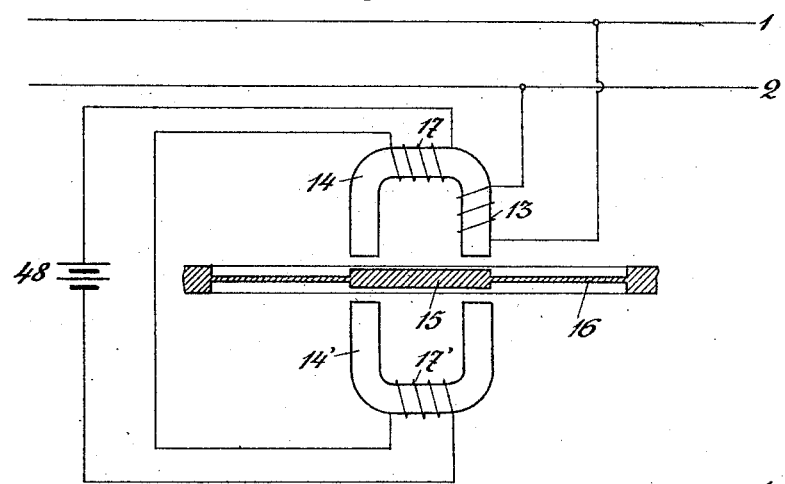
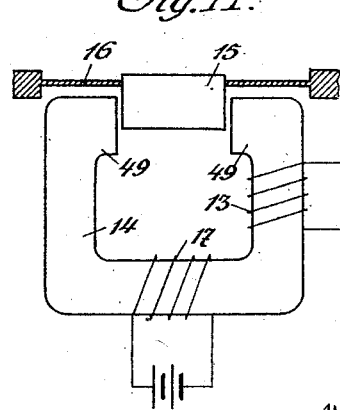
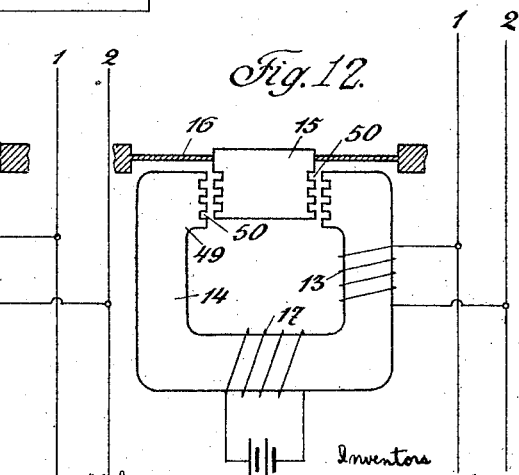
Inventors
Walter Hahnemann, Wilhelm Rudolph + Heinrich Hecht
by Knight Bros attorneys Patented Aug. 18, 1925.

1,550,251

UNITED STATES PATENT OFFICE.

WALTER HAHNEMANN, OF KITZEBERG, NEAR KIEL, AND WILHELM RUDOLPH AND HEINRICH HECHT, OF KIEL, GERMANY, ASSIGNORS TO SIGNAL GESELLSCHAFT M. B. H., OF KIEL, WERK RAVENSBERG, GERMANY.

PHASE-REGULATING DEVICE.

Application filed August 23, 1921. Serial No. 494,574.

(GRANTED UNDER THE PROVISIONS OF THE ACT OF MARCH 3, 1921, 41 STAT., L., 1313.)

*To all whom it may concern:*

Be it known that we, WALTER HAHNEMANN, WILHELM RUDOLPH, and HEINRICH HECHT, citizens of the German Republic, and residing at Kitzeberg, near Kiel, and at Kiel, county of Schleswig-Holstein, State of Prussia, Germany, have invented certain new and useful Improvements in Phase-Regulating Devices, of which the following is a specification.

Besides static condensers, which have been used as a means for increasing the efficiency of alternating current power plants by eliminating the difference of phase between the current and voltage caused in the distributing network (or in the appliances and machines connected thereto) by self-induction synchronous machines, collector machines, and more recently, so-called vibratory condensers, i. e. electro-magnetic apparatus with vibrating current-conductors, have been employed. The costliness of static condensers, and the large space required for them, have prevented their general application. The use of synchronous machines and collector machines is only economical if these machines are of large size.

The vibratory condensers provided hitherto for the purpose of reducing the difference of phase have only been used in connection with asynchronous machines. They are made to effect a displacement of the phase of the rotor current with respect to the electromotive force due to the slip. To this end they are inserted in the circuit of the rotor and caused to vibrate at the frequency of the slip, which is small in comparison with the frequency of the current in the supply mains, for which it is still just possible to construct them. Hence it has hitherto been necessary to employ a separate phase regulating device for each current-consuming machine or appliance, and in all cases in which no asynchronous motors are used vibratory condensers cannot be used at all.

In contradistinction hereto the present invention consists in a phase regulating device adapted for operation at the frequency of the supply mains, being arranged to be directly connected to the supply mains at any point. By the addition of special auxiliary means to vibratory condensers employed hitherto for phase regulating purposes, it is rendered possible to produce apparatus units which may be directly connected to the supply mains to operate at the frequency of the same.

By this means the advantage is obtained that, contrary to the known arrangements, only a single phase regulating device is required for a plurality of current-consuming appliances so that the attention and supervision required is made cheaper and simpler.

One feature of the invention consists in suspending the movable system of the vibratory condenser by springs, the particular part that is thus elastically and movably suspended being either the current coil or the armature of the vibratory condenser. By means of this spring suspension the frequency per second of the vibrator can easily be raised to 50 vibrations per second and the frequency of the supply mains can thus be attained.

Another feature of the invention consists in directly connecting a vibratory condenser, whose system is not elastically and movably suspended, to any point of the supply mains through a frequency transformer. In such a case the frequency of the supply mains is reduced by a known form of frequency transformer to the frequency that corresponds to the possible rate of vibration of an ordinary vibratory condenser.

A known fact upon which the invention is based is that an electromagnetic telephone receiver to which alternating current of varying frequencies is supplied exhibits abnormal properties as far as its impedance is concerned when the point is approached at which the natural rate of vibration of the diaphragm coincides with the frequency of the alternating current. While the self-induction of the telephone changes very little at frequencies that lie much higher or lower than the point of resonance, it increases very considerably shortly before the point of resonance is reached and decreases very abruptly when the said frequency passes through the point of resonance. The reason for this is to be sought in the abrupt change of the phase of the diaphragm at the point of resonance and in the reaction of its movements on the lines of force of the magnetic field of the telephone. It is true that a reaction of the moving diaphragm takes place at all frequencies, but when these frequencies differ considerably from the natural rate of vibration of the diaphragm the amplitude of its vibrations is too small to have any appreciable effect on the self-induction of the apparatus. But near the point of resonance this effect may be so considerable that the receiver, instead of acting as a self induction, acts as a capacity.

The invention consists in employing—instead of condensers—an electromagnetic vibrator, based on the principle of the telephone, and consisting of an iron core, current coils and a movable armature, for the purpose of eliminating the self-induction of elements (such as supply mains, machines etc.) carrying alternating currents of the frequencies generally employed. Instead of a fixed core and a movable armature being used, the iron bodies of which the magnet consists may be arranged to move relatively to each other in any suitable manner.

It is immaterial how the armature is arranged to move in an apparatus according to the invention—but the armature is preferably provided with elastic supports such as a diaphragm, springs or the like.

In cases in which an armature with a spring suspending or supporting member is used a permanent magnetic field excited by a continuous current is preferably employed. The elastic force of the spring suspension member is given by the mass of the armature and the frequency of the current supply, and the natural rate of vibration of the armature must approximate the said frequency. This latter is comparatively low (in the case of ordinary supply mains about 50 periods per second) so that the elastic force of the spring support must be made relatively small. From this it follows that, when a field excited by continuous current is employed, an attraction of the armature by the pole of the magnet will occur by which the armature is prevented from vibrating.

A problem which arises is therefore to prevent this disturbing attraction. The solutions contemplated by the invention are either to eliminate by an opposing force the attracting force due to the field excited by the continuous current, or to arrange the switching devices for the continuous and alternating currents in such a manner that the continuous current is positively switched on after the alternating current, i. e. during the vibration of the armature, or to omit the excitation of the field by continuous current—the last measure is possible, because its adoption only involves an increase of the alternating current required for operating the apparatus, this increase being offset by the saving of the energy required for polarizing the field. Hence the economical working of the apparatus does not suffer from this measure. It should be stated incidentally that the mechanical tuning frequency of a non-polarized apparatus must be made twice as high as that of a polarized apparatus, because one mechanical vibration takes place for each electrical alternation.

If the first of the three above-mentioned solutions is adopted, it must be remembered that the force which counterbalances the force of attraction of the magnetic field must not be such as to interfere with the tuning of the armature that is required for the proper operation of the apparatus. In an apparatus for practical use the counterbalancing force employed will preferably also be produced by an electric current. To this end a second magnetic field which is opposed to the operating field may be made to act upon the armature.

If a continuous current circuit is used for the purpose of polarizing the magnetic field, the apparatus should have an alternating current coil and a continuous current coil, and these coils will act like a transformer, i. e. an alternating current will be induced in the continuous current coil which necessitates the insertion of a choking coil in the continuous current circuit. This choking coil must be all the larger because it must also carry the continuous polarizing current.

Another feature of the invention consists in an arrangement which enables the said choking coil to be dispensed with or its size to be greatly reduced. In this arrangement one or more pairs of magnetic fields are employed the continuous current exciting coils of which are connected in such a manner that the alternating currents induced in them act in opposition and entirely or partly neutralize each other. It is possible to employ entire phase regulating apparatuses, or a single apparatus or a number of them with two magnetic fields each and two polarizing coils each may be used.

In accordance with another feature of the invention the disturbing attraction or bias of the vibrating armature may also be avoided by a special manner of arranging this armature. This consists in causing the armature to vibrate past parts of the poles of the electromagnet in a direction extending practically parallel to the adjacent pole faces or end surfaces of these parts. With this arrangement the attractive force of the main magnetic field acting on the movable armature and due to the continuous current winding is always equally strong in two opposite directions. The armature is held by a spring support in this arrangement also. The spring suspension member may here be used for eliminating the deleterious effects of an asymmetrical distribution of the magnetic field. To this end the armature may be suspended in such a manner that in vibrating into the space between the effective parts or poles of the electromagnet it has only to overcome the normal opposing force exerted by its spring support, but that this supporting member offers a much greater resistance to motions of the armature which are directed towards the surfaces of the said parts or poles. Suitable forms of supporting members for this purpose are band-springs, diaphragms or the like, which allow the armature to vibrate at right angles to their main surfaces but prevent it from moving in a direction parallel to these surfaces.

In order to obtain a distribution of the lines of force between the poles of the electromagnet which is favorable to the vibrations of the armature the pole pieces or the armature, or both, will preferably be serrated. The result achieved by this arrangement is that a considerable concentration of lines of forces will take place even at the outer edges (at the first serration) of the poles and armature so that a considerable force that operates to pull the armature into the space between the poles is obtained. In other words the field intensity is thus caused to change very considerably during the motion of the armature.

Figure 5:
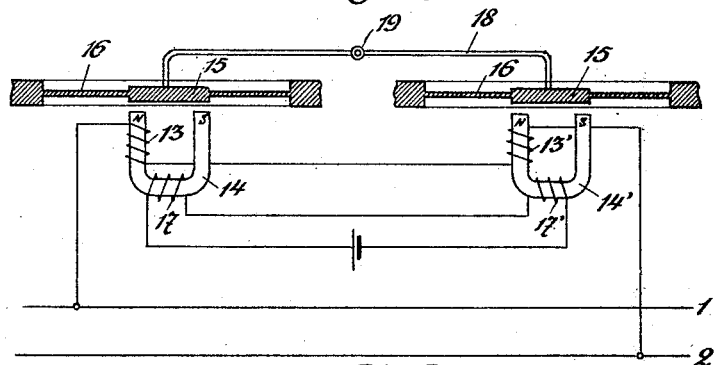
Figure 6:
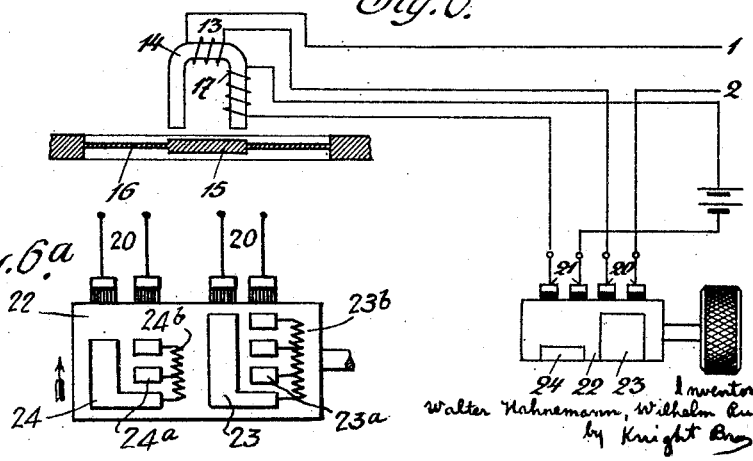
Figure 7:
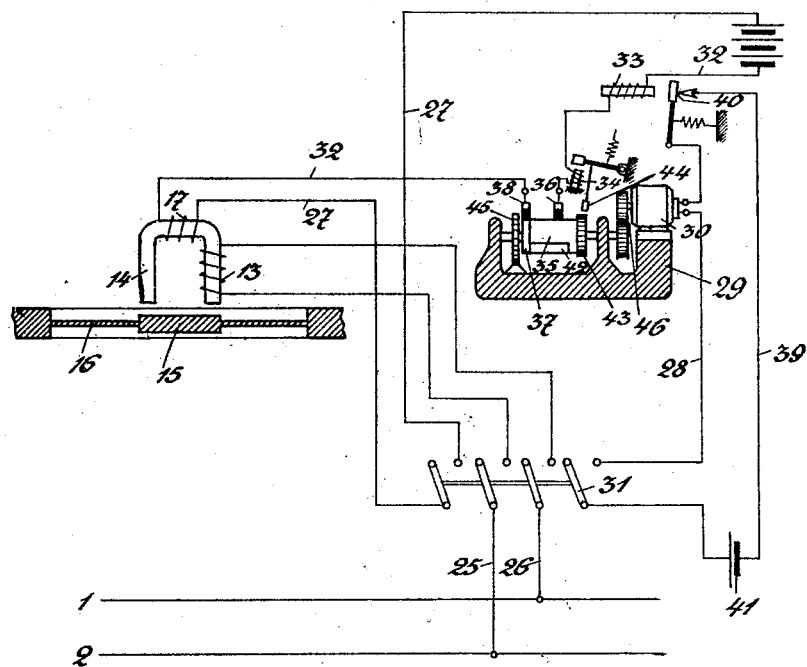
Figure 8:
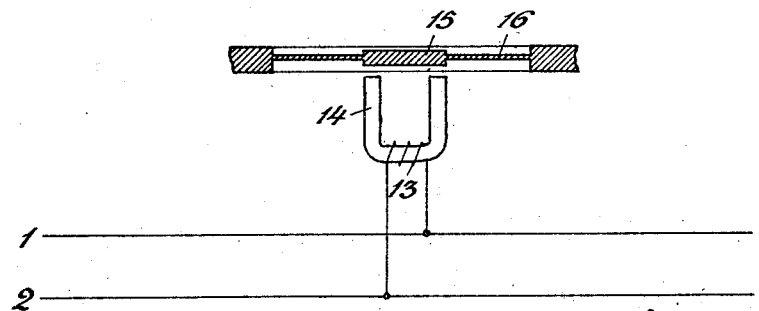

Some ways of carrying out the invention are illustrated in the drawing in which, Fig. 1 is a diagrammatic representation of a phase regulating device with a vibrating movement or system mounted on a spring support, Fig. 2 shows an electromagnetic vibratory condenser constructed like a telephone receiver, Fig. 3 represents graphs which explain the action of vibratory condensers, Figs. 4 to 8 show other ways of using the principle of the telephone receiver in constructing phase regulating devices, Fig. 4 representing an apparatus with one diaphragm and a compensating field, Fig. 5 a similar apparatus but with two diaphragms, Fig. 6 showing an apparatus in which a switch is provided by which the continuous current can only be switched on after the alternating current, Fig. 6ª showing a modification of the contacts arranged on barrel 22 in Fig. 6, Fig. 7 showing an apparatus similar to that of Fig. 6 but with an automatic motor-driven switch, Fig. 8 a phase regulator with a non-polarized field, Figs. 9 and 10 illustrate apparatus with arrangements which enable the choking coils ordinarily employed in the continuous current polarizing circuit to be dispensed with or to be made much smaller than usual, Fig. 9 being an apparatus with two diaphragms and Fig. 10 an apparatus with one diaphragm;

Fig. 11 shows an apparatus whose armature is arranged to vibrate in a direction parallel to the pole faces of its electromagnet, Fig. 12 shows a modification of Fig. 11 with its armature and pole faces serrated for the reasons hereinbefore set forth.

The phase regulating device of Fig. 1 is shown connected to the alternating current mains 1, 2. The device comprises an armature 5 adapted to vibrate in a magnetic field and provided with slip rings connected to the current supply mains. Attached to the armature is a pin 6 connected to one end of a spiral spring 8 whose other end is attached to a fixed holding member 7. 9 and 10 are pole pieces of an electromagnet.

The vibratory condenser shown in Fig. 2 is similar in construction to a telephone receiver having an electromagnet with vibrating diaphragm. 1, 2 are the alternating current supply mains to which current consuming machines or appliances 11, 12 are connected. The coil 13 which is wound on the iron core of the electromagnetic vibratory condenser is connected in parallel to the supply mains. The armature 15 of the electromagnet is supported by a diaphragm 16. The electromagnet is polarized by a continuous current flowing through its polarizing winding 17.

The operation of the several afore-described apparatus may be explained with the aid of Fig. 3. The curve $a$ represents the amplitudes of the vibrations which the armature executes at different frequencies of the exciting current, and the curve $b$ shows the corresponding values of the self-induction of the apparatus. In the region $c$—$d$ the curve $b$ goes beneath the abscissa, i. e. the apparatus acts like a capacity with resistance.

Figs. 4 and 5 illustrate phase regulating devices constructed on the principle of the telephone receiver and provided with magnetic fields which counterbalance the force of the polarizing field that might prevent the armature from vibrating.

In Fig. 4 15 is the vibrating armature held by a spring support in the shape of a diaphragm 16. Separated by a small gap from this armature 15 are the field magnets 14 and 14′ provided with alternating current coils 13 and 13′, and continuous current coils 17 and 17′. The alternating current coils are connected to the supply mains 1, 2. The attractive forces exerted by the continuous magnetic fields on the armature 15 counterbalance each other as nearly as possible. The alternating currents coils 13 and 13′ may be connected in series instead of in parallel as shown in Fig. 4, and instead of two separate continuous current batteries a common battery may be used.

The parts in Fig. 5 that correspond to those of Fig. 4 have like reference characters. However in Fig. 5 there are two armatures which are arranged to cooperate through a lever 18 pivoted at 19. The attractive forces set up in the magnets 14, 14′ tend to rotate the lever 18 in opposite directions and as these forces are equal the movable system remains in its normal position. The alternating current coils are connected in series and wound in such a way that the one coil operates to weaken its associated polarized field when the other coil operates to strengthen its field.

In the apparatus of Figs. 6 and 7 a different method is employed for preventing the vibration of the armature from being interfered with by the polarizing field produced by continuous current, this method consisting in switching on the alternating current before the continuous current. In Fig. 6 the leads to the continuous current coil 17 and the alternating current coil 13 of the electromagnet 14 are connected to the brushes 20, 21 of a barrel switch 22 provided with metallic contact surfaces 23, 24 which are so disposed that when the barrel is turned the alternating current brushes 20 are interconnected before the continuous current brushes 21.

In Fig. 7 the alternating current leads 25, 26, the continuous current lead 27, and the one lead 28 of a motor 30 that actuates a switching device 29, are led through a common four-armed switch 31. The continuous current circuit 32 leads from the one pole of the battery through the windings of two relays 33 and 34 to a brush 36 that contacts with the barrel of the rotary switch, and from the second pole of the battery the said circuit leads through the switch 31, to the polarizing winding 17 of the vibrator and to a brush 38 that wipes on a slipring 37 of the barrel switch. The second lead 39 to the motor 30 extends through the armature contact 40 of the relay 33 to the motor 30 which receives its current from the battery 41. The barrel has a segment 42 which is permanently connected through the slipring 37 to the brush 38 and which makes contact with the other brush 36 when the barrel is turned. Fixed to the barrel is a circle of teeth 43 adapted to be engaged by a detent 44 actuated by a relay 34. Also attached to the barrel is a spring 45 which tends to turn the barrel back into its normal no-contact position after it has been rotated so as to establish a connection between the brush 36 and the segment 42. The motor is coupled to the barrel through a speed changing gear 46.

The object of this arrangement is to enable the continuous current to be switched on at a certain time after the alternating current. The mode of operation of the arrangement is as follows: When the switch 31 is thrown to the right the circuit of the motor 30 is closed and at the same time the lead 27 is connected to the vibrator. The motor turns the barrel until the segment 42 makes contact with the brush 36. The continuous current circuit 27, 32 will then be closed. At the same time the relay 33 is energized and opens the contact 40, thus interrupting the motor circuit and causing the barrel to stop. The relay 34 is energized together with the relay 33 and moves the detent 44 into engagement with the toothed wheel 43 so that the barrel is locked. The relays remain energized and the parts of the barrel switch are kept in their operated positions so long as the vibrator is used. When the continuous current lead 27 is interrupted by the opening of the switch 31 the relays 33, 34 are deenergized and the contact 40 is closed while the barrel of the switch is restored to its normal position shown by the spring 45.

The time that expires between the two moments in which the alternating and continuous currents are switched on may be altered at will by regulating the speed of revolution of the motor, changing the speed changing gear of the barrel, altering the circumference of the barrel or the position of the segment on the same.

If, after the vibration of the armature of the apparatus of Figs. 6 and 7 has commenced, the continuous current is switched on with full strength, the vibrating parts will be excited in such a way at the moment of closure of the continuous current circuit that the frequency of the said vibrations will drop to one half of what it was up to the said moment. That is a vibratory system that was vibrating with a frequency of 100 will suddenly commence vibrating with a frequency of 50. This behaviour of the apparatus is permissible, because the vibratory system which is mechanically tuned to a low frequency (50 in the case under consideration) has not executed vibrations of an appreciable amplitude as long as its field is not polarized. Nevertheless it is preferable to even out the abrupt change in the rate of vibration by switching on the continuous current, or the continuous and alternating currents gradually. This can be accomplished by providing resistances in the circuits which are gradually cut out. Thus in the arrangements shown in Figs. 6 and 7, instead of one large contact plate, such as 23, 24, or 42 respectively, a number of contacts might be mounted on the barrel between which might be connected suitable resistances. As an example such a modification of barrel 22 of Fig. 6 is illustrated in Fig. 6$^a$ in which a large contact plate 23 and 24 is provided for each respective circuit, and adjacent to each of these plates are mounted on barrel 22 a number of contacts 23$^a$ and 24$^a$ respectively, which are connected respectively by resistances 23$^b$ and 24$^b$. When these plate groups come into operative relation with their respective brush pairs 20 and 21, these resistances are at first interposed into the circuits controlled and gradually cut out as the barrel is rotated until the brush pairs are shortcircuited on the last contact. Contact plate 42 in Fig. 7 may be similarly subdivided and provided with resistances. These resistances might be disposed in suitable manner inside of the barrel, not shown here.

In Fig. 8 a phase regulating device is shown in which the vibrations of the armature produced by the alternating current is not interfered with by a permanent or polarized field, because such a field is absent.

In Fig. 9 the possibility of dispensing with, or reducing the size of, the choking coils ordinarily needed in the continuous current or polarizing circuit on account of the alternating currents induced in the same is obtained by using two electromagnets 14 and 14' with separate armatures 15 and 15' and coils 13, 13' and 17, 17' respectively, the latter (17, 17') being supplied with continuous current from the battery 48. The alternating current coils 13, 13' are connected to the supply mains 1, 2 in series. The alternating currents induced in the coils 17, 17' are made to neutralize each other more or less by so connecting these coils that their currents oppose one another. The current flowing in these coils is thus kept so weak that no special choking coil (or only a small choking coil) needs to be inserted in their circuit.

The method employed in the apparatus of Fig. 10 is similar. This apparatus has only one armature but it also has two electromagnets 14, 14' provided with continuous current coils 17, 17' connected to a battery 48. The alternating coil 13 which is associated with one electromagnet 14 only induces an alternating current in 17. The motion of the armature 15 also gives rise to an alternating current in 17'. The coils 17 and 17' are connected in such a manner that the alternating currents induced in them counteract each other. Any residual voltage that might result from slight differences between the alternating voltages in the two coils may be choked off by a very small choking coil.

In the apparatus shown in Figs. 11 and 12 the armature is held by its spring support in such a manner that it vibrates between the pole faces of the electromagnet but—in contradistinction from the devices hereinbefore described—is prevented from moving towards the said pole faces. The armature vibrates in a direction approximately parallel to the surfaces of the pole faces. The attractive forces of the two poles exerted on the armature and due to the excitation by continuous current are equal and opposed to each other so that no bias can be given to the armature. The armature is supported by a spring member in the form of a diaphragm or metal ribbon 16.

In order to obtain a favorable distribution of the lines of force of the magnetic field the effective surfaces or pole faces 49 of the magnet and the cooperating surfaces of the armature may be serrated as shown in Fig. 12. The dimensions of the teeth are preferably made to correspond with the amplitude of the vibrating part, i. e. the height of the teeth is made about equal to the amplitude of vibration of the armatures.

We claim:—

1. In an alternating current supply system means for improving the power factor by reducing the phase difference between current and voltage, a phase regulator having a vibratory body and a spring support for holding said body, said system being tuned substantially to the frequency of the current supply system, said regulator adapted to be connected to any point of the supply system.

2. In an alternating current supply system means for improving the power factor by reducing the phase difference between current and voltage, a phase regulator having a vibratory armature and a spring support for said armature, the natural frequency of said system being slightly greater than the frequency of the current supply system, said regulator adapted to be connected to any point of the supply system.

3. In an alternating current supply system means for improving the power factor by reducing the phase difference between current and voltage, a phase regulator having a vibratory body and a spring support for holding said body, said system being tuned substantially to the frequency of the current supply system, said regulator adapted to be connected to any point of the supply system, irrespective of the location of the current consuming device causing said difference in phase.

In testimony whereof we affix our signatures.

WALTER HAHNEMANN.
WILHELM RUDOLPH.
HEINRICH HECHT.